June 12, 1934.     K. C. MONROE     1,962,647
ELECTRIC HEADING MACHINE AND CONTROL THEREFOR
Filed March 16, 1931
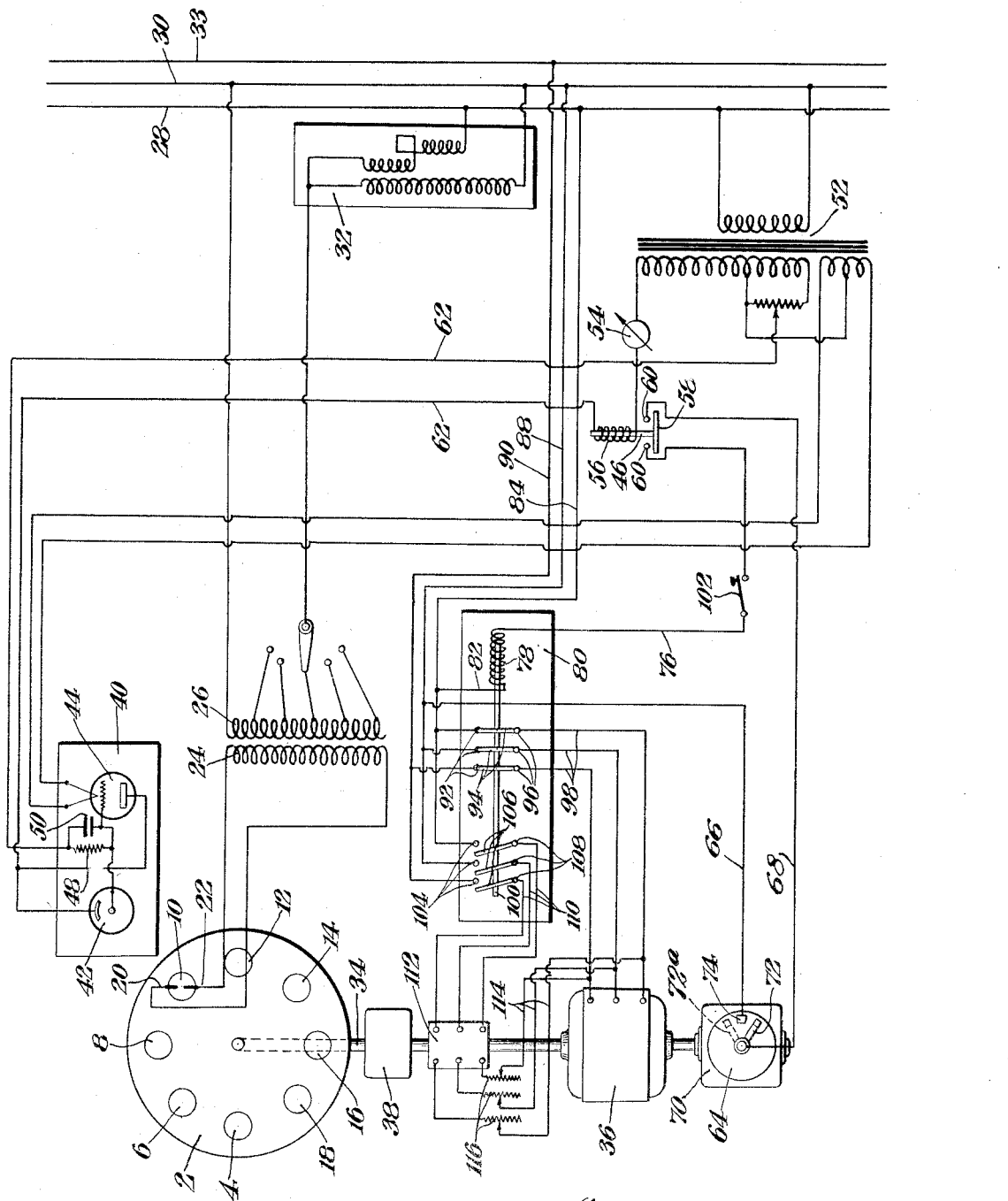
Kenneth C. Monroe
INVENTOR
BY Prindle, Bean & Mann
ATTORNEYS Patented June 12, 1934

1,962,647

UNITED STATES PATENT OFFICE 1,962,647

ELECTRIC HEADING MACHINE AND CONTROL THEREFOR

Kenneth C. Monroe, Bridgeport, Conn., assignor to Bridgeport Brass Company, Bridgeport, Conn., a corporation of Connecticut Application March 16, 1931, Serial No. 522,969

22 Claims. (Cl. 219—3)

This invention relates to a machine, such as an electric heading machine in which work blanks are heated to a required temperature and thereafter manipulated in some way for instance, forged, the machine having associated with it a light or heat responsive device which stops the machine if the blanks are not heated to the required temperature within the allotted period of time.

In an electric heating machine, work blanks such as pieces of metallic rod or tubing, are heated to a glowing temperature and are then forged. It sometimes happens, however, that the work blanks are not heated to the required temperature before the machine moves to carry the blank from the heating position to the forging position with the result that the forming or forging dies close on a cold blank, and when this happens the dies are broken and the entire machine may be greatly damaged.

The present invention is designed to remedy this defect in the present machines by placing a light or heat responsive device in such a position that the heat or light radiated by the blank affects the heat or light responsive device to stop the machine if the blank is not up to the required forging temperature when the machine moves to carry the blank from the heating position to the forging position. In order to prevent the heat or light responsive device from stopping the machine when a cold blank is first inserted in the heater or while it is being heated there to the desired predetermined temperature, a timing mechanism is used and synchronized with the machine so that the heat or light responsive device does not operate to stop the machine but, on the other hand, will stop the machine if the blank is not up to the required temperature when the machine moves or is ready to move the blank (which would ordinarily be at the required temperature) from the heating position 10 to the forging position 12. This prevents the dies from closing on a cold blank and thus prevents the dies and the machine from being broken.

Other objects and features of the invention will more fully appear from the following claims taken in conjunction with the description and the accompanying drawing, which, however, must be construed as merely illustrating and in no way limiting the invention in the specific embodiment shown and described.

The drawing indicates rather diagrammatically the parts of an automatic heating and forging machine with the associated light responsive device and timing mechanism together with the circuits connecting same, and the means for stopping the machine whenever the blank is not up to the required heat.

The invention will be described in connection with an electric heading machine having the rotating head 2 with the position of the work blank indicated diagrammatically at 4, 6, 8, 10, 12, 14, 16 and 18. The cold blank may be inserted into the head at the position 4 and preliminary operations may be performed on the blank as the head moves it into the positions 6 and 8. It should be understood that the head moves to carry the blank from one position to the other at predetermined intervals of time, that is, the head does not rotate continuously, but remains stationary in each position for a certain time interval, usually 2 or 3 seconds. When the blank reaches the position 10, electrodes 20 and 22 contact with it to bring it to the required forming or forging temperature. It is obvious that the blank must be heated to the required temperature within the two or three seconds that it remains stationary in the position 10. After the period of rest in position 10 (during which period the blank should come up to the required temperature) the head moves the blank successively to the positions 12, 14 and 16, during which the hot blank is formed or forged into the required shape by means of dies, and finally the finished article is ejected from the head at the position 18.

The electrodes 20 and 22 receive electricity through a transformer 24, the variable voltage primary 26 of which receives its power from power lines 28 and 30, preferably through an induction voltage regulator 32, or a similar piece of apparatus. The third power wire of a three phase alternating current supply line is indicated at 33.

The head 2 is driven by a shaft 34 from a motor 36 through suitable gearing 38.

The light responsive device 40 may consist of a photo cell 42 which is so placed as to receive the light or heat from the work blank when it is in position 10. An amplifier tube 44 is usually a part of the light responsive device and enables the device to pass enough electric current to operate a light responsive relay 46. A grid resistor 48 and grid condenser 50 enable the device to be operated from alternating electric current in the power lines 28 and 30, through the transformer 52 with the connections as shown. An ammeter 54 may be used if desired to indicate the current passing through the coil 56 of the light responsive relay 46. The effect of the light responsive device with the connections as shown is that so long as the work in the position 10 is glowing with a sufficient intensity, that is, whenever the work is up to the required heat, the light responsive device does not pass enough current to operate the relay 46 to raise the contactor 58 or keep it raised into contact with the contacts 60. When a cold work blank comes into the position 10, the light responsive device raises the contactor 58, but when the temperature of the work blank rises to the temperature for which the light responsive device is set, the current passing through the wires 62 is not strong enough to energize the coil 56 to hold up the contactor 58, and the contactor therefore moves to break contact at the contacts 60.

In series with the contacts 60 of the switch 46 is a timing device 64 which closes this part of a circuit through wires 66 and 68 at certain time intervals. This timing device is driven from the motor or any other part of the machine through gears in the gear box 70 and is synchronized with the mechanism which drives the head 2 so that the rotating contactor 72 makes contact with the pole 74 a fraction of a second before the head 2 moves the work blank from the position 10 to the position 12. From one of the two contacts 60 of the light responsive relay, a wire 76 leads to a coil or other suitable electro-responsive device 78 in a motor switch 80 and from the other side of the coil a wire 82 conducts the current to the wire 84, which in turn, is connected to the main power line wire 28. The circuit through the timing device 64, light responsive relay 46 and coil 78 is completed through a wire 66 which brings the electric current from the other main power line 30.

The motor 36 may be and preferably is a three phase alternating current motor. The current for the motor is brought through the wires 84, 88 and 90 to contacts 92 in the motor switch 80 from which movable switch blades 94 carry the current to the contacts 96 from which the wires 98 conduct the current to the motor. When the switch blades 94 are set on the contacts 92, the motor is driven forwardly but whenever the circuit of the coil 78 is completed, the blades 94 are drawn from the contacts 92, or are tripped by any suitable means such as the rod 100 which is moved by the solenoid or coil 78, to shut off the power which drives the motor 36 in forward direction. A manually operated switch 102 prevents the energization of the coil 78 when the machine is started and permits the switch blades 94 to complete the circuit to the motor 36, irrespective of the action of the timing device 64 or the light responsive relay 46 until the first work blank is brought up to heat in the position 10.

In order quickly to stop the motor 36 whenever the timing device 64 and the light responsive relay 46 cooperate to energize the coil 78, a motor reversing or braking mechanism is used which operates to positively stop the motor 36 and prevent it from over running whenever the coil 78 pulls the blade switches 94 from the contacts 92. For this purpose, the wires 84, 88 and 90 are also connected to a series of contacts 104 and a plurality of switch blades 106 are adapted to carry the current from the contacts 104 to the contacts 108 from which wires 110 conduct the current to a centrifugal switch or contactor 112 which may conveniently be driven from the motor shaft. The switch blades 106 are operated from the coil or solenoid 78 through the tripping bar 100 so that as soon as the switch blades 94 leave the contacts 92, the switch blades 106 engage contacts 104. From the centrifugal contactor 112, wires 114 conduct the current to the motor with two of the wires reversed so that when the current passes to the motor through the wires 114, the motor 36 tends to rotate backwardly. The centrifugal contactor 112 is so constructed as to complete the circuit through the wires 110 and 114 when the motor is running, and to break the circuit between the wires 110 and 114 whenever the motor is at rest. The operation of the motor reversing or braking mechanism is that when the coil 78 is energized to move the tripping bar 100 to throw the blade switches 94 off of the contacts 92, the blade switches 106 are moved into contact with the contacts 104 which completes the motor reversing circuit and tends to reverse its direction of rotation. This is an effective brake. The motor will immediately slow down and come to a stop, and when the rotation of the motor has ceased or nearly ceased, the centrifugal contactor 112 breaks the circuit between the wires 110 and 114 so that the motor 36 does not begin to operate in the reverse direction.

In order to prevent the full voltage of the power line being applied to the motor by the reversing switch and thus prevent injury to the motor, resistances 116 are placed in the motor circuit between the contacts 108 and the motor. These resistances are preferably variable resistances which can be set to permit enough current to pass to the motor 36 to stop the motor before the work blank can be moved from the position 10 to the position 12 and the dies close on the work piece or blank, but yet prevent the passage of sufficient current to injure the motor. If desired, the contacts on the variable resistances 116 can be operated from the centrifugal circuit breaker 112 to keep the maximum permissible voltage on the motor as it slows down, as will be understood by those acquainted with the use of such apparatus.

The operation of the system will now be described. When the machine is first started the switch 102 is held open until the first cold or slightly warmed blank reaches the position 10. The cold work blank is not up to the required temperature and is therefore giving off no appreciable amount of light or heat. Under these conditions the light responsive device 40 passes sufficient current to operate the relay 46 to raise the contactor 58 in position bridging contacts 60. The arm 72 of the timer 64 is in the dotted line position 72a having just passed over the contact 74, and therefore, although the circuit through the coil 78 of the motor switch 80 is completed at the relay 46, it is broken at the timer 64, and the coil 78 is not energized to move the blades 94 of the motor switch 80 from the live contacts 92. If the machine is functioning as it should, the work blank in the position 10 will be at the required temperature by the time the arm 72 of the timer 64 is at the full line position and will be giving off enough heat or light to affect the photo cell 42 to decrease the current through the wires 62, so that the contactor 58 moves away from the contacts 60. Therefore, when the arm 72 of the timer contacts with the pole 74, the coil 78 of the motor switch 80 is not energized because its circuit is broken at the relay 46, and the motor 36 continues to run in the forward direction, moving the properly heated work blank from the position 10 to its next position 12 and bringing another work blank from the position 8 to the position 10. If however, the work blank does not come up to the proper temperature and does not give off enough light or glow to change the condition of the photo cell 42, the current in the wires 62 remains at full strength which is sufficient to hold the contactor 58 of the relay 46 in position bridging the contacts 60, and then when the arm 72 of the timer 64 makes contact with the pole 74, the circuit through the motor switch coil 78 is closed to energize the coil to operate the tripping bar 100 to move the switch blades 94 from the live contacts 92, with the result that the circuit through the wires 98 to the motor 36 is broken. This movement of the bar 100 brings the switch blades 106 onto the contacts 104, and the motor is stopped, thus preventing a blank which is not heated to the required temperature from moving from the position 10 to the position 12.

The invention as just described includes a light or heat sensitive device which decreases the flow of current to the relay 46 to operate it when the light or heat from the work blank in the position 10 reaches a certain intensity. It is recognized, however, that other photo cells may be used and connected in the circuit in other ways so that they operate to increase the flow of current to the relay 46 or a corresponding relay, instead of decreasing it. A different relay 46 may then be used as may also other forms of motor switches and motor brakes, and timers may also be used with different forms of light responsive devices and relays. It is, therefore, to be understood that, although a particular and preferred form of the invention has been described, many various modifications may be made and it is desired that the invention be construed as broadly as the claims taken in conjunction with the prior art may allow.

What I claim is:

1. The combination with a machine adapted to heat and forge metallic work blanks, of a light responsive device positioned to receive light radiated by the blank, means for stopping the machine, and timed connections operatively connecting said means and said device adapted to stop the machine whenever the blank is not glowing at the end of a predetermined time interval.

2. The combination with a machine adapted to heat metallic work blanks to a glowing temperature within a predetermined period of time and then to forge said blanks, of a light responsive device positioned to receive light radiated by the blank, means for stopping the machine, and timed connections operatively connecting said means and said device adapted to stop the machine whenever the blank is not glowing at the end of the time interval.

3. The combination with a machine adapted to electrically heat metallic work blanks to a glowing temperature and then to forge said blanks, of a light responsive device positioned to receive light radiated by the blank, means for stopping the machine, a timer controlling said means, an element controlled by the light responsive device and also controlling said means, said means being operated to stop the machine only when the timer and said element concurrently operate in their control.

4. The combination with a machine adapted to heat successively work blanks fed into the machine and bring each work blank to a glowing temperature within a predetermined period of time, of a light responsive device positioned to receive light radiated by the blank being heated, means for stopping the machine, and timed connections operatively connecting said means and said device adapted to stop the machine whenever the blank is not glowing at the end of the time period.

5. The combination with a machine adapted to heat a work blank within a predetermined period of time, when the blank is in one position and then move the blank to another position, of a light responsive device positioned to receive light radiated by the blank, means for stopping the machine, and timed connections operatively connecting said means and said device adapted to stop the machine whenever the blank being heated is not at the required temperature at the end of the time interval.

6. The combination with a machine adapted to heat a work blank within a predetermined period of time when the blank is in one position and then move the blank to a second position, of a light responsive device positioned to receive light radiated by the blank and means controlled by the light responsive device which prevents the blank from being moved to the second position whenever the blank being heated is not at the required temperature at the end of the time interval.

7. The combination with a machine adapted to heat a work blank within a predetermined period of time when the blank is in one position and then move the blank to a second position, of a light responsive device positioned to receive light radiated by the blank, and means controlled by the light responsive device operable just prior to moving the blank to the second position to prevent the blank from being moved to the second position whenever the blank being heated is not at the required temperature at the end of the time interval.

8. The combination with a machine adapted to heat a work blank, of a light responsive device positioned to receive light radiated by the blank, means for stopping the machine, and timed connections operatively connecting said means and said device and adapted to stop the machine whenever the blank is not glowing with the required brilliancy at the end of a predetermined time interval.

9. The combination with a machine adapted to heat a blank within a predetermined period of time, of a light responsive device positioned to receive light from the blank, a motor driving said machine, means for stopping the motor, and timed connections operatively connecting said device and said means and adapted to stop the motor whenever the blank is not glowing at the end of the predetermined period of time.

10. The combination with a machine adapted to heat a work blank within a predetermined time when the blank is in one position and then move the blank to a second position, of a light responsive device positioned to receive light radiated by the blank, a motor driving the machine to move the blank from the first position to the second position at the end of the predetermined period of time, and timed connections controlled by the light responsive device to break the motor circuit to stop the motor whenever the blank being heated is not at the required temperature at the end of the time interval.

11. The combination with a machine adapted to heat a work blank within a predetermined period of time when the blank is in one position and then move the blank to a second position, of a light responsive device positioned to receive light radiated by the blank, a motor driving the machine to move the blank from the first position to the second position at the end of the predetermined period of time, a switch controlling the motor, a timer synchronized with the machine and connections between said timer and switch and light responsive device to operate said switch to stop the motor whenever the blank being heated is not at the required temperature at the end of the time interval.

12. The combination with a machine adapted to heat a work blank within a predetermined period of time when the blank is in one position and then move the blank to a second position, of a light responsive device positioned to receive light radiated by the blank, a motor driving the machine to move the blank from the first position to the second position at the end of the predetermined period of time, a switch controlling the motor, an electric circuit adapted to operate the switch to stop the motor when said circuit has closed, a timer in the circuit and synchronized with the machine and adapted to partially complete said circuit at the end of said predetermined period of time, and a relay controlled by the light responsive device adapted to complete said circuit when the timer has partially completed the circuit and the blank is not at the required temperature.

13. The combination with a machine adapted to heat a blank within a predetermined period of time, of a light responsive device positioned to receive light from the blank, a motor driving said machine, means for deenergizing and braking the motor, and timed connections operatively connecting said device and said means and adapted to de-energize and brake the motor whenever the blank is not glowing at the end of the predetermined period of time.

14. The combination with a machine adapted to heat a blank within a predetermined period of time, of a light responsive device positioned to receive light from the blank, a motor driving said machine, means for energizing the motor to run it in a forward direction, means to brake the motor, and timed connections operatively connecting said device and said braking means and adapted to de-energize the motor and operate the means to brake the motor whenever the blank is not glowing at the end of the predetermined period of time.

15. The combination with a machine adapted to heat a blank within a predetermined period of time, of a light responsive device positioned to receive light from the blank, a reversible motor driving said machine, a motor circuit, means for connecting the motor into the circuit to run the motor forward or backward, and timed connections operatively connecting said device and said means adapted to connect the motor into the reverse circuit whenever the blank is not glowing at the end of a predetermined period of time.

16. The combination with a machine adapted to heat a blank within a predetermined period of time, of a light responsive device positioned to receive light from the blank, a reversible motor for driving said machine, a motor circuit, a forward motor switch adapted to connect the motor into the circuit to drive the motor forwardly, a reverse motor switch adapted to connect the motor into the circuit to drive the motor rearwardly, and timed connections operatively connecting said device and said switches and adapted to open the forward motor switch and close the reverse motor switch whenever the blank is not glowing at the end of the predetermined period of time.

17. The combination with a machine adapted to heat a blank within a predetermined period of time, of a light responsive device positioned to receive light from the blank, a reversible motor for driving said machine, a forward and a reverse motor circuit, a forward motor switch adapted to connect the motor into the circuit to drive the motor forwardly, a reverse motor switch adapted to connect the motor into the circuit to drive the motor rearwardly, automatic means in the reverse motor circuit to break said circuit when the machine stops, and timed connections operatively connecting said device and said switches and adapted to open the forward motor switch and close the reverse motor switch whenever the blank is not glowing at the end of a predetermined period of time, whereas the reverse motor circuit acts to brake the motor and the said means acts to break the circuit to the motor when the motor stops.

18. The combination with a machine adapted to heat a blank within a predetermined period of time, of a light responsive device positioned to receive light from the blank, a reversible motor for driving said machine, a forward and a reverse motor circuit, a forward motor switch adapted to connect the motor into the circuit to drive the motor forwardly, a reverse motor switch adapted to connect the motor into the circuit to drive the motor rearwardly, a centrifugal switch in the reverse motor circuit to break said circuit when the motor stops, and timed connections operatively connecting said device and said forward and reverse motor switches and adapted to open the forward motor switch and close the reverse motor switch whenever the blank is not glowing at the end of the predetermined period of time whereby the reverse motor circuit acts to brake the motor and said centrifugal switch acts to break the circuit to the motor when the motor stops.

19. The combination with a machine adapted to heat a blank within a predetermined period of time, of a light responsive device positioned to receive light from the blank, a reversible motor driving said machine, a motor circuit, means for connecting said motor into the circuit to run the motor forward or backward, and means operatively connecting said device and said first mentioned means and adapted to connect said motor into the reverse circuit whenever the blank is not glowing at the end of a predetermined period of time, said means including a timer mechanism.

20. The combination with a machine adapted to heat a blank within a predetermined period of time, of a light responsive device positioned to receive light from the blank, a reversible motor driving said machine, a motor circuit, means for connecting said motor into the circuit to run the motor forward or backward, means operatively connecting said device and said first mentioned means and adapted to connect said motor into the reverse circuit whenever the blank is not glowing at the end of a predetermined period of time, said means including a timer mechanism, and a relay controlled by said light responsive device.

21. In combination, feed means for delivering blanks, one after another, to a heating station to heat each blank to a predetermined temperature during a predetermined time-interval and thence delivering it to a succeeding station; a device responsive to the temperature of the blank at the heating station; feed-stop means controlled by said responsive device tending to stop the feed while the blank is below the predetermined temperature but not when it reaches said temperature, said means comprising and operating through electrical contacts; and timing means interconnected with said feed-stop means so that the latter is enabled to stop the feed only at the end of the heating interval for each blank, said timing means comprising and operating through electrical contacts in series with the first named contacts.

22. In combination, feed means for delivering blanks, one after another, to a heating station to heat each blank to a predetermined temperature during a predetermined time-interval and thence delivering it to a succeeding station; a device responsive to the temperature of the blank at the heating station; feed-stop means controlled by said responsive device tending to stop the feed while the blank is below the predetermined temperature but not when it reaches said temperature; and timing means interconnected with said feed-stop means so that the latter is enabled to stop the feed only at the end of the heating interval for each blank.

KENNETH C. MONROE.